United States Patent [19]

Sandberg

[11] 3,715,517

[45] Feb. 6, 1973

[54] TRIPPING ARRANGEMENT FOR RINGING CURRENT SIGNALS IN TELEPHONE EXCHANGES

[75] Inventor: Curt Ove Bille Sandberg, Tyreso, Sweden

[73] Assignee: Telefonaktiebolaget LM Ericsson, Stockholm, Sweden

[22] Filed: March 8, 1971

[21] Appl. No.: 121,922

[30] Foreign Application Priority Data

March 19, 1970 Sweden ................................3787/70

[52] U.S. Cl. ..............................................179/18 HB

[51] Int. Cl. ..............................................H04m 3/02

[58] Field of Search ..........................179/18 HB, 16 F

[56] References Cited

UNITED STATES PATENTS 3,187,106 6/1965 Steinmetz..........................179/18 HB 1,373,624 4/1921 Martin ..............................179/18 HB 3,621,143 11/1971 Chambers, Jr. ......................179/16 F

FOREIGN PATENTS OR APPLICATIONS 177,132 11/1961 Sweden............................179/18 HB

*Primary Examiner*—Thomas W. Brown

*Attorney*—Hane, Baxley & Spiecens

[57] ABSTRACT

In an automatic telephone exchange a relay means is provided for ringing current signal tripping upon calls to a subscriber's instrument. The volume and cost for such a relay means are reduced with the help of a current-direction-dependent supervisory relay and a capacitance means connected in parallel and with a direct current source and a resistance means charging said capacitance means to a voltage of such a magnitude and polarity that the supervisory relay receives a direct-current voltage in backward direction during the ringing signals.

2 Claims, 1 Drawing Figure

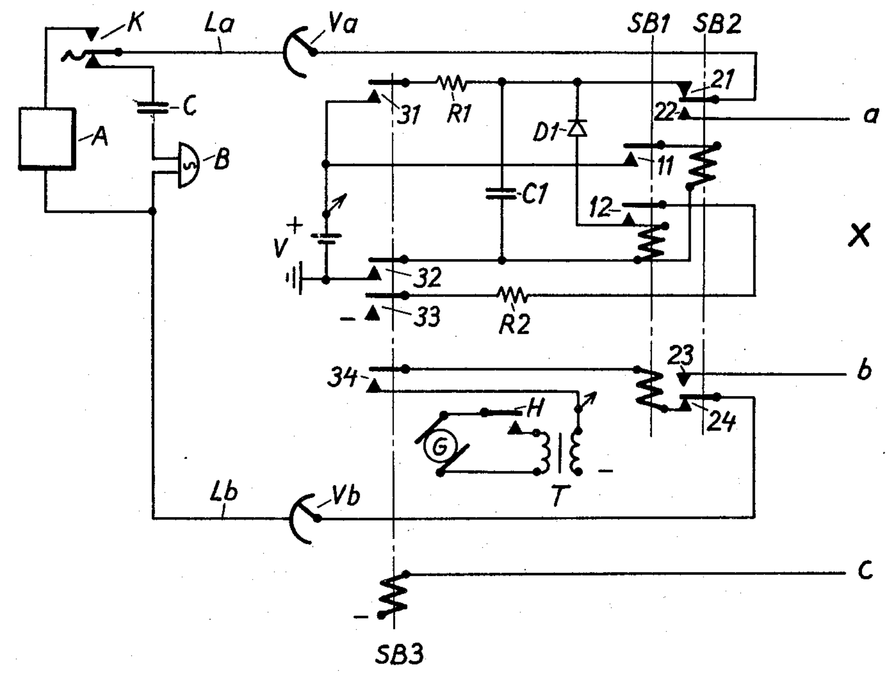
INVENTOR
Curt Ove Bille Sandberg
BY Hane, Baxley and Spiecens
ATTORNEYS

TRIPPING ARRANGEMENT FOR RINGING CURRENT SIGNALS IN TELEPHONE EXCHANGES

This invention refers to automatic telephone exchanges and concerns a relay arrangement for ringing current signal tripping upon calls to a subscriber's instrument. The signals are sent from a ringing current generator in the telephone exchange through a subscriber's line and the relay arrangement which also is arranged in the telephone exchange disconnect the ringing current generator from the subscriber's line when the loop through the subscriber's line is closed for direct current upon answering. The subscriber's instrument contains a signal receiving means, usually a bell, connected in series with a capacitor which allows the ringing current to pass. During the sending of the ringing current signals the ringing generator is connected to one of the line branches of the subscriber's line and a supervisory relay associated with the relay arrangement is connected to the other line branch of the subscriber's line. Usually the supervisory relay is a slow-operating electromechanic relay which is not operated by ringing current. However for this purpose a considerable attenuation is necessary which is achieved by means of a thick copper tube around the iron core of the relay. For this reason such supervisory relays become large and expensive as they demand a large winding space and much copper.

The supervisory relay can consist of quite a small electromagnetic relay without slow-operation if the power winding of the relay is connected in parallel with a great capacitance. The magnitude of the capacitance is however a disadvantage and an object of the invention is to provide a relay arrangement which works with good reliability in operation, is provided with a small relay and has a lower capacitance than what has been required up to now, so that the space or volume requirement and costs of the arrangement are reduced. This is achieved in such a way that the supervisory relay is dependent on the current direction and the capacitance means which is connected in parallel with the relay, is held charged during the sending of the ringing signals by means of a direct-current source, via a resistance means, of a direct-current voltage of such a magnitude and direction that the supervisory relay receives direct-current voltage in the backward direction and is not operated by the ringing current passing through the capacitor and the signal receiving means of the subscriber's instrument.

Upon calls to subscriber's instruments an intermittent ringing is used and for this reason it must be possible to disconnect the ringing generator both during the interval between two ringing signals and when a ringing current is sent out. For this reason the ringing generator or a ringing transformer associated therewith, is connected in series with a direct-current battery having such a voltage and current direction that the direct-current voltage through the capacitance connected in parallel with the supervisory relay changes direction when an answer is obtained from the subscriber's instrument.

The invention will be described more fully with reference to the accompanying drawing.

In the sole FIGURE of the drawing, A is a subscriber's instrument having a cradle contact K and a receiving means for ringing signals consisting of a bell B and a capacitor C. A subscriber's line with the line branches La and Lb connects the subscriber's instrument with an automatic telephone exchange X containing a ringing current generator composed of a generator G, a transformer T and an impulse unit H. In the telephone exchange there are also connecting circuits each having a selector Va, Vb, relays SB1–SB3, resistors R1,R2 and a rectifier D1, and a capacitance means C1. Furthermore there is provided the common exchange battery, the positive pole of which is connected to earth, and an auxiliary battery v, the negative pole of which is connected to earth. The relay SB1 is dependent on the current direction due to the rectifier D1 but can also be a polarized relay. More bells B can be connected in parallel.

Upon a call to the subscriber's instrument A the selector Va, Vb is set to the line La, Lb and the relay SB3 is operated. The contacts 31–34 are closed. The following circuit is completed: the battery *v*, the contact 31, the resistor R1, the capacitor C1, the contact 32, to earth. The capacitor C1 is charged. The following ringing current circuit is completed: earth, the contact 32, the capacitor C1, the contact 21, elements Va, La, K, C, B, Lb, and Vb, the contact 24, the lower winding of the supervisory relay SB1, the contact 34, the right winding of the transformer T, to negative. The lower winding of the supervisory relay SB1 has a low resistance and is of no importance whatever to the invention. The object of it will be described later on.

The greater part of the ringing voltage will be received by the line La, Lb, the bell B And the capacitor C. A smaller part of the ringing voltage will be received by the capacitor C1, the magnitude of which is so adapted that the sum of the battery voltage *v* and the amplitude of the ringing voltage is positive or inconsiderably negative. Dependent on the line resistance of the line La, Lb, capacitor C1 is dimensioned in such a way that the relay SB1 is not operated by ringing current via short lines but operates by means of direct current from the exchange battery upon answer from subscribers' instruments connected via lines having a high resistance.

Upon answer the following circuit is completed: earth, contact 32, the upper winding of the relay SB1, diode D1, the contact 21, selector Va, line La, the closing of the cradle contact K, elements A, Lb, Vb actuated upon answer, the contact 24, the lower winding of relay SB1, the contact 34, the right winding of the transformer T, to negative. The relay SB1 attracts its armature. The contacts 11, 12 are actuated. Then relay SB1 is held in a circuit passing through the contacts 32, 12, 33 and the resistor R2.

The relay SB2 operates in the following circuit: the auxiliary battery *v*, the contact 11, the winding of the relay SB2, the contact 32, to earth. The contacts 21–24 are actuated, in consequence of which the ringing current circuit is opened and the subscriber's line La, Lb is connected to the speech channel *a*,*b* in the telephone exchange X.

By means of the lower winding of the relay SB1 it is achieved that the ringing current is broken if the line branch Lb becomes connected to earth, for example upon an earth fault in the subscriber's line.

What is claimed is:

1. In an automatic telephone system which includes at least a subscriber's instrument having a signal receiving means connected in series with a capacitor to a two-branch subscriber's line and a telephone exchange which includes a ringing current generator connectable to one branch of the subscriber's line during the generation of a ringing signal in response to the initiation of a call to the subscriber's instrument, a ringing current signal tripping means comprising a supervisory relay means connectable to the other branch of the subscriber's line and responsive only to current flow in a particular direction, a capacitance means connected in parallel with said supervisory relay, a direct-current source and a resistor connected in series and connectable to said capacitance means and said supervisory relay means when the subscriber's instrument is being called so that said direct-current source charges said capacitance means to a value sufficient to prevent the current from the ringing current generator flowing through the subscriber's line from operating said supervisory relay means as long as the subscriber's instrument is in an unanswered condition, and said supervisory relay means including means responsive to the answering of the call by the subscriber's instrument to disconnect the ringing current generator from the subscriber's line.

2. In an automatic telephone exchange according to claim 1 wherein said ringing current generator is connected in series with a further direct-current source having such a voltage and polarity that the direct voltage across said capacitance means changes polarity when the loop through the subscriber's line is closed.

* * * * *